United States Patent
Akashi

(10) Patent No.: US 10,059,153 B2
(45) Date of Patent: Aug. 28, 2018

(54) PNEUMATIC TIRE

(71) Applicant: BRIDGESTONE CORPORATION, Chuo-ku, Tokyo (JP)

(72) Inventor: Tokumasa Akashi, Copley, OH (US)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 382 days.

(21) Appl. No.: 14/766,615

(22) PCT Filed: Feb. 4, 2014

(86) PCT No.: PCT/JP2014/000588
§ 371 (c)(1),
(2) Date: Aug. 7, 2015

(87) PCT Pub. No.: WO2014/132567
PCT Pub. Date: Sep. 4, 2014

(65) Prior Publication Data
US 2015/0367689 A1    Dec. 24, 2015

(30) Foreign Application Priority Data

Feb. 28, 2013 (JP) ................................ 2013-039771

(51) Int. Cl.
*B60C 11/04* (2006.01)
*B60C 11/117* (2006.01)
(Continued)

(52) U.S. Cl.
CPC ............ *B60C 19/002* (2013.01); *B60C 11/03* (2013.01); *B60C 11/032* (2013.01); *B60C 11/12* (2013.01);
(Continued)

(58) Field of Classification Search
CPC ..... B60C 11/032; B60C 19/002; B60C 11/12; B60C 11/04
See application file for complete search history.

(56) References Cited

U.S. PATENT DOCUMENTS

2003/0089439 A1    5/2003   Thiebaud
2009/0151832 A1*   6/2009   Miyoshi ............. B60C 11/0302
                                                        152/209.8
(Continued)

FOREIGN PATENT DOCUMENTS

CN          1968832 A      5/2007
JP          S63306903 A    12/1988
(Continued)

OTHER PUBLICATIONS

Machine translation for Japan 2010-260403 (no date).*
(Continued)

*Primary Examiner* — Steven D Maki
(74) *Attorney, Agent, or Firm* — Kenja IP Law PC

(57) ABSTRACT

The pneumatic tire described herein is provided with, in a tread surface, at least two circumferential grooves continuously extending in a tread circumferential direction, and a resonator disposed in a land part defined between two circumferential grooves having different sectional areas of the at least two circumferential grooves, the resonator having an air chamber opened to a land part surface in a position separated away from the circumferential groove, one or more narrowed necks communicating the air chamber with one of the two circumferential grooves, and one or more narrowed necks communicating the air chamber with the other circumferential groove, wherein a sectional area S1 of the narrowed neck of the resonator, opened to a circumferential groove with a relatively large sectional area is smaller than a sectional area S2 of the narrowed neck of the
(Continued)

resonator, opened to a circumferential groove with a relatively small sectional area.

1 Claim, 3 Drawing Sheets

(51) Int. Cl.
 *B60C 11/12* (2006.01)
 *B60C 19/00* (2006.01)
 *B60C 11/03* (2006.01)
(52) U.S. Cl.
 CPC ....... *B60C 11/04* (2013.01); *B60C 2011/0341* (2013.01)

(56) References Cited

U.S. PATENT DOCUMENTS

2010/0154953 A1* 6/2010 Kaji .................. B60C 11/12
 152/209.21

2010/0175799 A1* 7/2010 Takahashi ........... B60C 11/0309
 152/209.3
2012/0222788 A1* 9/2012 Nishiwaki .......... B60C 11/0306
 152/209.18
2013/0061992 A1* 3/2013 Mathonet ................ B60C 11/04
 152/209.18

FOREIGN PATENT DOCUMENTS

| JP | H05-338411 A | | 12/1993 |
|---|---|---|---|
| JP | 06-055811 U | * | 8/1994 |
| JP | 2002211210 A | | 7/2002 |
| JP | 2004526023 A | | 9/2004 |
| JP | 2004284499 A | | 10/2004 |
| JP | 2007-269144 A | | 10/2007 |
| JP | 2010-260403 A | * | 11/2010 |
| JP | 2010-260403 A | | 11/2010 |

OTHER PUBLICATIONS

Machine translation for Japan 06-055811 U (no date).*
Mar. 11, 2014 International Search Report issued in International Patent Application No. PCT/JP2014/000588.

* cited by examiner

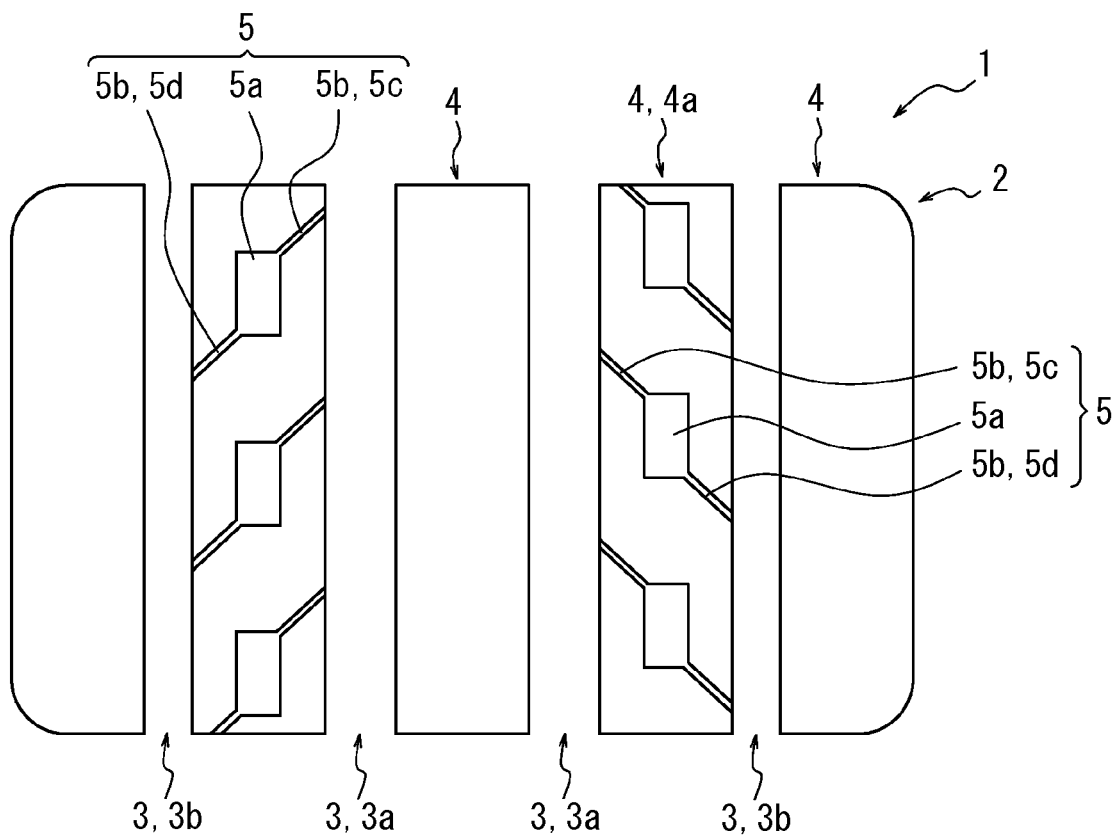

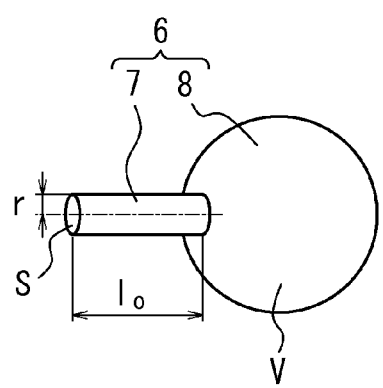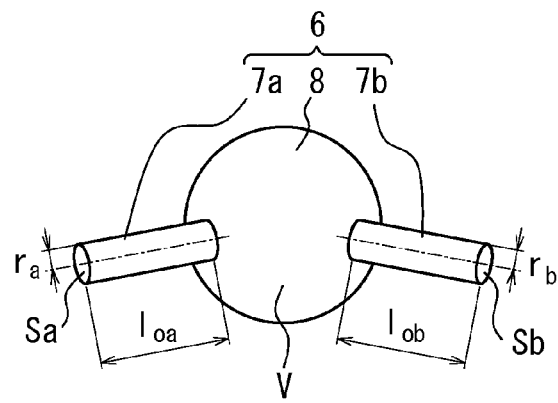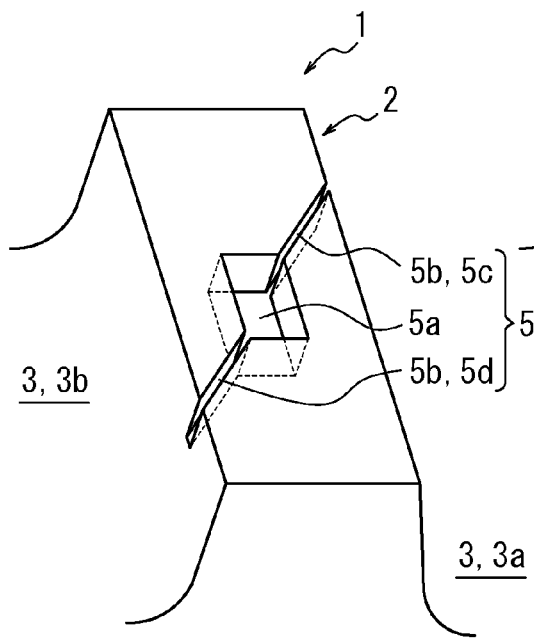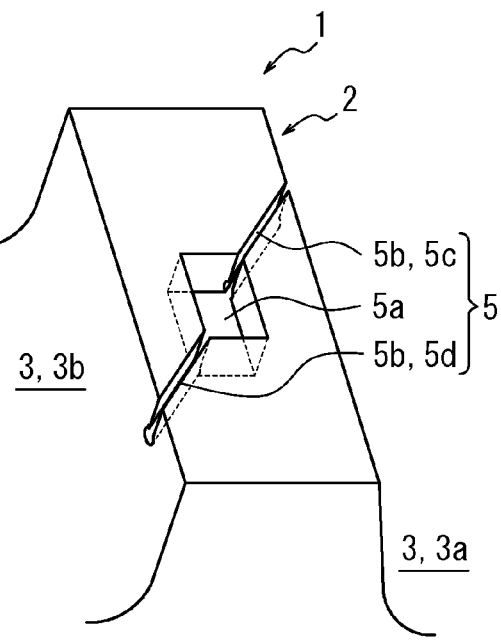

PNEUMATIC TIRE

TECHNICAL FIELD

This disclosure relates to a pneumatic tire.

BACKGROUND

In recent years, as vehicles have become quiet, vehicle noises caused by the rolling load of a pneumatic tire have become a large factor of vehicle noises, and there is a demand for a reduction of such noises. Tire noises of high frequency, particularly of around 1000 Hz have become a main cause of vehicle exterior noises, and there has been a demand to reduce such tire noises. This was also desired from the viewpoint of addressing environmental issues.

Tire noises of around 1000 Hz are generated mainly by air column resonance. Air column resonance sound is a noise generated by resonance of air in a tube defined by a circumferential groove continuously extending in the tread circumferential direction and the road surface. In general vehicles, the sound is generated in the range of around 800 Hz to 1200 Hz, and due to the high sound pressure level at the peak and the wide frequency range, it is a large part of the noises generated by a pneumatic tire. Further, since the human hearing sense is especially sensitive to noises in a frequency band of around 1000 Hz, a reduction in such air column resonance sound is also effective in terms of improving quietness felt by drivers at the time of travelling.

As pneumatic tires with reduced air column resonance sound, for example, a pneumatic tire provided with, in the land part defined by circumferential grooves, a resonator having an air chamber opened to the land part surface and one narrowed neck communicating the air chamber to a circumferential groove (e.g. PTL 1 (JPH05338411A)), and a pneumatic tire provided with, in the land part defined between two circumferential grooves, a resonator having an air chamber opened to the land part surface, one or more narrowed necks communicating the air chamber to one of the two circumferential grooves, and one or more narrowed necks communicating the air chamber to the other circumferential groove (e.g. PTL 2 (JP2007269144A)) have been proposed. It is disclosed that, according to the former pneumatic tire, disposing a resonator would enable reducing air column resonance sound generated in a circumferential groove. Further, it is disclosed that, according to the latter pneumatic tire, since air column resonance sound generated in two circumferential grooves can be reduced together, the number of resonators to dispose can be reduced while effectively reducing air column resonance sound compared to the resonator having a narrowed neck opened to one circumferential groove of the former pneumatic tire, and therefore a decrease in land part rigidity can be prevented.

CITATION LIST

Patent Literature

PTL 1: JPH05338411A
PTL 2: JP2007269144A

SUMMARY

Technical Problem

With a pneumatic tire provided with, in the land part defined between two circumferential grooves, a resonator having one narrowed neck opened to one of the two circumferential grooves and one narrowed neck opened to the other circumferential groove, it was revealed that, for example, when the sectional areas of each narrowed neck are the same, there are cases where the air column resonance sound is hardly reduced. Further, when the sectional areas of the two circumferential grooves to which each narrowed neck of the resonator opens are different, rigidity difference is caused between land parts where each narrowed neck opens to a circumferential groove, and therefore there was a risk of deterioration in steering stability at the time of vehicle travelling.

It could therefore be helpful to provide a pneumatic tire with improved noise reduction performance exhibited by a resonator without deteriorating steering stability.

Solution to Problem

The pneumatic tire described herein is provided with, in a tread surface, at least two circumferential grooves, and a resonator disposed in a land part defined between two circumferential grooves having different sectional areas of the at least two circumferential grooves, the resonator having an air chamber opened to a land part surface in a position separated away from the circumferential groove, one or more narrowed necks communicating the air chamber with one of the two circumferential grooves, and one or more narrowed necks communicating the air chamber with the other circumferential groove, wherein a sectional area S1 of the narrowed neck (hereinafter referred to as "first narrowed neck") of the resonator, opened to a circumferential groove with a relatively large sectional area is smaller than a sectional area S2 of the narrowed neck (hereinafter referred to as "second narrowed neck") of the resonator, opened to a circumferential groove with a relatively small sectional area.

Since the sectional areas of each narrowed neck opened to the circumferential grooves are different, the resonator is allowed to sufficiently function. Further, since a narrowed neck with a relatively small sectional area is opened to, among the two circumferential grooves, the circumferential groove on the side where a decrease in rigidity in the corresponding land part easily occurs by opening a narrowed neck to a circumferential groove i.e. the circumferential groove with a relatively large sectional area, a local decrease in rigidity of the land part caused by disposing a resonator can be suppressed, and therefore deterioration in steering stability can be prevented.

In the pneumatic tire described herein, sectional area S1 and sectional area S2 of the narrowed necks preferably satisfy the relation of $S2/S1 \geq 1.2$. By satisfying this relation, it is possible to effectively enhance noise reduction performance of the resonator and further improve steering stability.

For the pneumatic tire described herein, the resonator is not limited to a particular type as long as air column resonance sound is effectively reduced. As an example, a Helmholtz-type resonator may be used. In this case, the resonator 6 can be modeled as the shape shown in FIG. 2(*a*), and the resonance frequency $f_0$ can be expressed by formula (1) wherein the radius, the length and the sectional area of the narrowed neck 7 are each expressed as r, $l_0$, S, the volume of the air chamber 8 is expressed as V, and the speed of sound is expressed as c.

[Formula 1]

$$f_0 = \frac{c}{2\pi}\sqrt{\frac{S}{(l_0 + 1.3r)V}} \quad (1)$$

The correction of length of the narrowed neck 7 in the above formula is normally obtained by experiments, and the value depends on the document. Here, a value of 1.3 r is used.

Further, the resonance frequency $f_0$ in a case of a Helmholz-type resonator 6 provided with two narrowed necks 7a and 7b per one air chamber 8, such as that schematically shown in FIG. 2(b), can similarly be expressed by formula (2) wherein the radii, the lengths and the sectional areas of the narrowed necks 7a and 7b, are each expressed as $r_a$ and $r_b$, $l_{0a}$ and $l_{0b}$, $S_a$ and $S_b$, the volume of the air chamber 8 is expressed as V, and the speed of sound is expressed as c.

[Formula 2]

$$f_0 = \frac{c}{2\pi}\sqrt{\frac{S_a + S_b}{\frac{((l_{0a} + 1.3r_a) + (l_{0b} + 1.3r_b))}{2}V}} \quad (2)$$

Therefore, the resonance frequency $f_0$ of the resonator 6 can be changed as required by selecting the sectional areas $S_a$ and $S_b$ of the narrowed necks 7a and 7b, the volume V of the air chamber 8, and the like. Further, as shown in formula (2) with an example of two narrowed necks 7, when there is a plurality of narrowed necks 7, it is known that there is no practical problem in calculating by considering it equivalent to one narrowed neck 7 having a total sectional area of the plurality of narrowed necks 7a and 7b and an average length of the plurality of narrowed necks 7a and 7b.

The sectional areas of the circumferential groove and the narrowed neck are the sectional areas in the cross section along the direction perpendicular to the extending direction of the circumferential groove and the narrowed neck. In a case where the sectional areas vary, the average sectional area (the volumes of the circumferential groove and the narrowed neck divided by their extending lengths) is used as the sectional area. In a case where there are two or more narrowed necks opened to each circumferential groove for one resonator, the total sectional area of those narrowed necks is the sectional area S1, S2 of the narrowed neck.

Further, unless otherwise specified, the ground contact condition of the tread surface refers to a state where the tire is assembled with an applicable rim, with a prescribed air pressure applied and a load of 80% of the maximum load applied. The "Applicable rim" is a valid industrial standard for the region in which the tire is produced or used, and refers to a standard rim (or "Approved Rim", "Recommended Rim") of applicable size described in the "JATMA (Japan Automobile Tire Manufacturers Association) YEAR BOOK" in Japan, "ETRTO (European Tyre and Rim Technical Organisation) STANDARD MANUAL" in Europe, "TRA (THE TIRE and RIM ASSOCIATION INC.) YEAR BOOK" in the United States of America, and the like. A state where "prescribed air pressure is applied to a tire assembled with an applicable rim" refers to a state where the tire is attached to the above applicable rim, and the air pressure applied is the air pressure corresponding to the maximum load capacity of a single wheel in applicable size/ply rating (maximum air pressure) described in JATMA and the like. Here, air can be replaced with inert gas such as nitrogen gas, and the like.

Further, unless otherwise specified, various dimensions of the tire refer to dimensions of the tire assembled with an applicable rim with air pressure applied and no load applied.

Further, "narrowed neck" and "air chamber" used herein both refer to those which open in the ground contact surface under the previously mentioned ground contact conditions.

Advantageous Effect

It is possible to provide a pneumatic tire with improved noise reduction performance exhibited by a resonator without deteriorating steering stability.

BRIEF DESCRIPTION OF THE DRAWINGS

In the accompanying drawings:

FIG. 1 is a partially developed plan view of a tread pattern of the pneumatic tire according to one embodiment;

FIG. 2A schematically shows a Helmholtz-type resonator with one narrowed neck, and FIG. 2B schematically shows a Helmholtz-type resonator with two narrowed necks;

FIG. 3A and FIG. 3B are perspective views illustrating embodiments of forming the resonator in the pneumatic tire of FIG. 1;

DETAILED DESCRIPTION

Figure 4A:
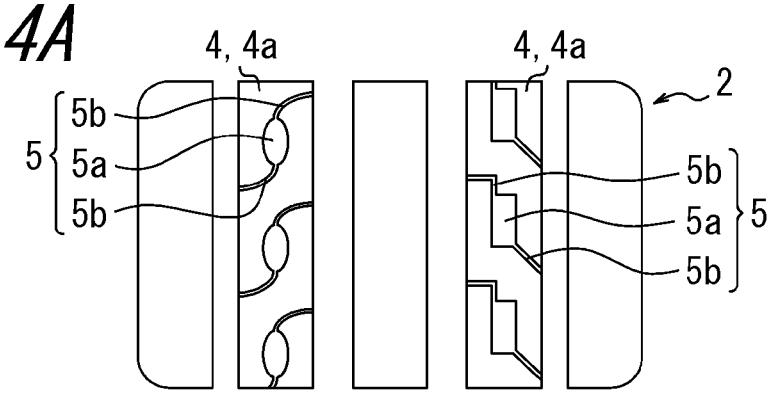
FIG. 4A to FIG. 4C are developed plan views similar to FIG. 1 of modified examples of each of the narrowed neck and the air chamber in the pneumatic tire of FIG. 1.

The following describes one embodiment of the disclosure in detail with reference to the drawings.

FIG. 1 is a partially developed plan view of a tread pattern of pneumatic tire 1 according to one embodiment of the disclosure. Since the internal reinforcing structure and the like of the tire are similar to those of a general radial tire, they are not illustrated.

In a pneumatic tire 1 according to one embodiment of the disclosure, at least two circumferential grooves 3 continuously extending substantially in the tread circumferential direction are provided on a tread surface 2. In FIG. 1, four circumferential grooves 3 are provided on a tread surface 2. FIG. 1 shows a form where the circumferential grooves 3 extend in a linear manner along the tread circumferential direction. However, as long as the circumferential grooves 3 extend continuously in the tread circumferential direction, any form of extending for example, a zigzag form, wave-like form or the like may be adopted.

Further, on the tread surface 2, as shown in FIG. 1, three rows of rib-shaped land parts 4 are defined in the inner side in the tire width direction by circumferential grooves 3 adjacent to each other, and two rows of rib-shaped land parts 4 are defined in the outer side in the tire width direction (shoulder parts) by the circumferential groove 3 and the ground contact end in the outer side in the tire width direction of the tread surface 2. Further, two of the three rows of rib-shaped land parts 4 in the inner side in the tire width direction are defined by two circumferential grooves 3a and 3b which have different sectional areas. In the circumferential grooves 3 disposed on the tread surface 2 shown in FIG. 1, from the viewpoint of ensuring drainage performance of the pneumatic tire 1, the sectional area of the circumferential groove 3a located in the inner side in the tire width direction is larger than the sectional area of the circumferential groove 3b in the outer side in the tire width direction. However, it is also possible to make the sectional area of the circumferential groove 3b in the outer side in the tire width direction larger than the sectional area of the circumferential groove 3a located in the inner side in the tire width direction. Further, as shown in FIG. 1, the large/small relation between the respective sectional areas of the two circumferential grooves 3a and 3b is created by varying the groove width of the circumferential grooves. However, the relation can be created by varying the depth, or both the width and the depth of each circumferential groove.

In the rib-shaped land part 4a defined between two circumferential grooves 3a and 3b having different sectional areas, as shown in FIG. 1, a resonator 5 having an air chamber 5a opened to the land part surface in a position separated away from the circumferential groove 3, a narrowed neck 5b communicating the air chamber 5a with one of the two circumferential grooves 3a and 3b, and a narrowed neck 5b communicating the air chamber 5a with the other circumferential groove, is disposed. Further, as shown in FIG. 1, one narrowed neck 5b is opened to one circumferential groove 3 and the other circumferential groove 3 respectively. However, it is also possible to make two or more narrowed necks 5b opened to one circumferential groove 3 and the other circumferential groove 3, respectively or only in one side.

Meanwhile, with a resonator comprising one or more narrowed necks opened to one circumferential groove, and one or more narrowed necks having the same sectional area as said narrowed neck(s), opened to the other circumferential groove, there were cases where the air column resonance sound was hardly reduced. Further, when the sectional areas of the two circumferential grooves to which each narrowed neck of the resonator opens are different, rigidity difference is caused in the land parts where the narrowed necks are disposed, and therefore there was a risk of deterioration in steering stability at the time of vehicle travelling.

Therefore, in the pneumatic tire 1 of the disclosure, the resonator 5 is formed so that the sectional area S1 of the narrowed neck (first narrowed neck) 5c which opens to the circumferential groove 3a with a relatively large sectional area is smaller than the sectional area S2 of the narrowed neck (second narrow neck) 5d which opens to the circumferential groove 3b with a relatively small sectional area.

With this pneumatic tire 1, among the dimensions and shapes of the narrowed neck 5b and air chamber 5a constituting the resonator 5, particularly, the sectional areas S1 and S2 of each narrowed neck 5b opened to the circumferential grooves 3 are varied. Therefore, resonance from the resonator 5 generated respectively via the narrowed neck 5c of the resonator 5, opened to the circumferential groove 3a with a relatively large sectional area and the narrowed neck 5d of the resonator 5, opened to the circumferential groove 3b with a relatively small sectional area would not cancel each other, and accordingly the resonator 5 is allowed to sufficiently function. Further, since the narrowed neck 5c with a relatively small sectional area S1 is opened to, among the two circumferential grooves 3a and 3b, the circumferential groove 3a in which a decrease in rigidity of the rib-shaped land part 4a where the narrowed neck opens occurs relatively easily by opening the narrowed neck 5b to a circumferential groove 3 i.e. the circumferential groove 3a with a relatively large sectional area, the decrease in the rigidity of rib-shaped land part 4a surrounding the first narrowed neck 5c caused by disposing the resonator 5 can be suppressed, and therefore steering stability can be improved. As a result, flexibility in the terms of designs of the tread pattern improved. For example, by disposing various types of resonators 5 having different resonance frequency in the tread surface 2, it is possible to make it compatible with a wide frequency range of air column resonance sound while allowing each resonator 5 to sufficiently function, without deteriorating steering stability.

In the pneumatic tire 1 described herein, as long as the sectional areas of the two circumferential grooves 3a and 3b defining the rib-shaped land part 4a with the resonator 5 disposed thereon are different from each other, the sectional areas of circumferential grooves 3 other than the two circumferential grooves 3a and 3b having different sectional areas may be made the same as each other or different from each other. Further, in tread surface 2, other resonators comprising an air chamber and a narrowed neck may be disposed in the rib-shaped land parts 4 in the center side in the tire width direction and the outer side in the tire width direction shown in FIG. 1.

Further, as shown in FIG. 1, the large/small relation between respective sectional areas S1, S2 of the first narrowed neck 5c and the second narrowed neck 5d is created by varying the width of each narrowed neck. However, the relation can be created by varying the depth, or both the width and the depth of each narrowed neck.

Here, the sectional area S1 of the first narrowed neck 5c and the sectional area S2 of the second narrowed neck 5d preferably satisfy the relation of S2/S1≥1.2. By satisfying this relation, the phenomenon where the resonance from the resonator 5 generated through the first and second narrowed necks 5c and 5d cancel each other is more effectively suppressed, and the resonator 5 is allowed to further sufficiently function. Further, it is possible to more effectively suppress the decrease in rigidity of the rib-shaped land parts 4a surrounding the first narrowed neck 5c caused by disposing a resonator 5, and therefore steering stability can further be improved. Although the upper limit of the ratio of the sectional area S2 of the second narrowed neck 5d to the sectional area S1 of the first narrowed neck Sc is not limited, if the sectional area S2 of the second narrowed neck 5d is excessively larger than the sectional area S1 of the first narrowed neck 5c, it tends to be difficult to form the resonator 5 so that it has a desired resonance frequency. Therefore, it is more preferable that the sectional area S1 of the first narrowed neck 5c and the sectional area S2 of the second narrowed neck 5d satisfy the relation of 3≥S2/S1≥1.2. Further, as mentioned above, from the viewpoint of easily forming the resonator 5 so that it has a desired resonance frequency while allowing the resonator 5 to more effectively function, it is further preferable that the sectional area S1 of the first narrowed neck Sc and the sectional area S2 of the second narrowed neck 5d satisfy the relation of 2≥S2/S1≥1.2.

Regarding the narrowed neck 5b and the air chamber 5a of the resonator 5, as long as they open to the road surface in the ground contact surface under the ground contact conditions mentioned above, and a desired resonance frequency is generated, the width, depth, form of extending, or the like are not particularly limited. Regarding the narrowed neck 5b, for a tire assembled with an applicable rim and in a state where prescribed air pressure is applied and no load is applied, for example, the width opened to the land part surface is preferably in the range of 0.5 mm to 2.0 mm, and more preferably in the range of 0.7 mm to 2.0 mm. From the viewpoint of forming the resonator 5 so that it has a desired resonance frequency and allowing it to sufficiently function, the depth from the tread surface 2 of the narrowed neck is preferably ⅓ to ½ of the depth from the tread surface 2 of the circumferential groove 3 to which the narrowed neck 5b opens. The cross sectional shape along the direction perpendicular to the extending direction of the narrowed neck 5b, as shown in FIG. 3, can be formed as for example, squares such as rectangles (FIG. 3(a)), or a so-called flask shape having an enlarged part in the bottom part of the narrowed neck 5b (FIG. 3(b)). The form of extending of the narrowed neck 5b, as shown in FIG. 4(a), can be a straight shape, a bent shape, a curved shape or a combination thereof. Although not shown in the drawings, the sidewalls of the narrowed neck 5b may be provided with a plurality of projections projected from the sidewalls, to prevent the narrowed neck 5b from unexpectedly closing.

Regarding the dimension, shape and the like of the above narrowed neck 5b, each of the plurality of narrowed necks 5b of one resonator 5 may be made so that they are the same as each other or different from each other. Further, the dimension, shape and the like of the narrowed necks 5b of a plurality of resonators 5 in one row of rib-shaped land parts 4a or in different rib-shaped land parts 4a, may be made so that they are the same as each other or different from each other.

Further, regarding the air chamber 5a of the resonator 5, as shown in FIG. 4(a), the opening shape of the air chamber 5a to the surface of the land part 4a can be made a shape of a polygonal outline, or a shape of a curved outline such as a round shape, oval shape and the like. Further, the shape of the bottom part of the air chamber 5a can be made a flat shape, a curved shape and the like. Further, the opening shapes and the like of the each air chamber 5a of the plurality of resonators 5 in one row of rib-shaped land parts 4a or in different rib-shaped land parts 4a can be made the same as or different from each other.

Figure 4B:
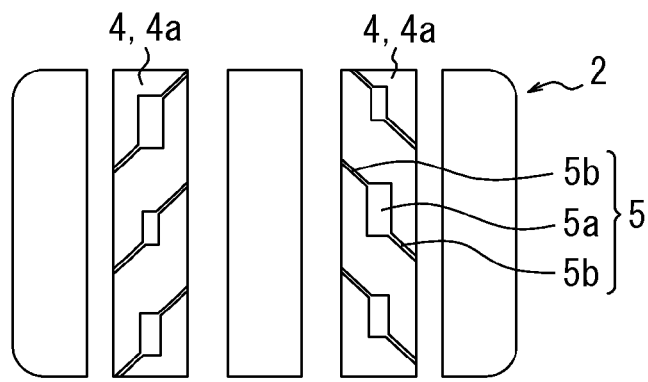

In FIG. 4(b), the dimensions of the air chambers 5a are varied to vary the resonance frequencies of the resonators 5. However, as mentioned above, by varying the dimensions, shapes and the like of the narrowed necks 5b and/or the air chambers 5a of the resonators 5, a plurality of resonators 5 each having different resonance frequencies can be disposed in the rib-shaped land parts 4a of the tread surface 2.

To form a resonator 5 disposed in the tread surface 2 so that it has a desired resonance frequency and to allow it to sufficiently function, and for example, to open every narrowed neck 5b of the resonator 5 to the road surface in the ground contact surface under the ground contact conditions mentioned above, the total number of first narrowed necks 5c and second narrowed necks 5d of a resonator 5 is preferably two to four.

Figure 4C:
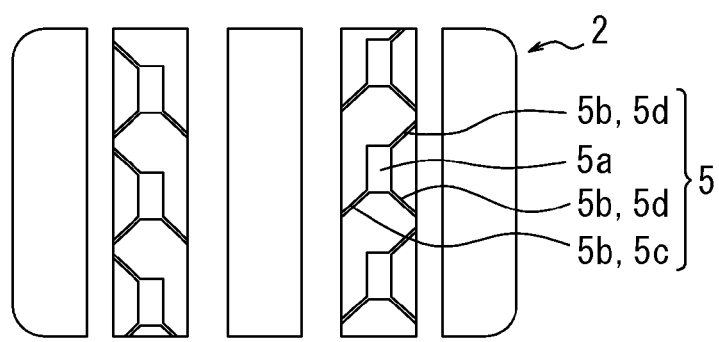

The resonator 5 shown in FIG. 4(c) has one first narrowed neck 5c and two second narrowed necks 5d, and more second narrowed necks 5b are disposed compared to first narrowed necks 5c. However, it is also possible to dispose more first narrowed necks 5c than second narrowed necks 5b.

From the viewpoint of allowing the resonator 5 to further sufficiently function without deteriorating steering stability, when disposing three or more narrowed necks 5b, it is preferable that there are more second narrowed necks 5d than first narrowed necks 5c.

Figure 5:
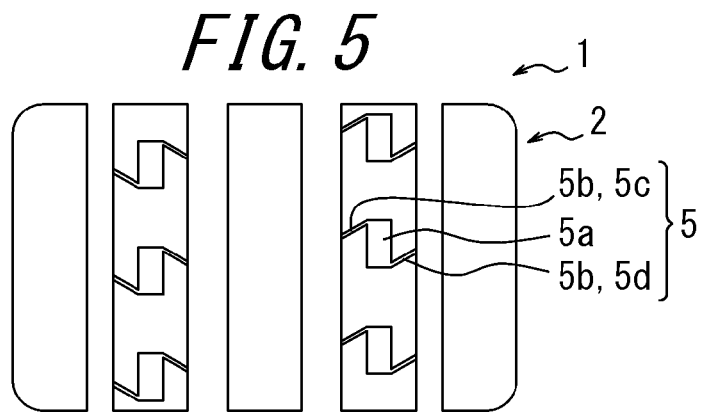
FIG. 5 is a developed plan view similar to FIG. 1 of a modified example of the extending direction from the air chamber of the narrowed neck in the pneumatic tire of FIG. 1.

For the pneumatic tire 1 described herein, the extending direction of each of the first narrowed neck 5c and the second narrowed neck 5d to the air chamber 5a is not particularly limited. However, from the viewpoint of reducing the pitch noise generated when the edges opened to the land part surface, of the narrowed neck 5b and the air chamber 5a collides with the road surface when the tire 1 rolls, it is preferable that each of the first narrowed neck 5c and the second narrowed neck 5d do not extend toward the inner side in tread circumferential direction with respect to the air chamber 5a as shown in FIG. 5, but that they extend toward the outer side in tread circumferential direction with respect to the air chamber 5a as shown in FIG. 1. In other words, it is preferable to extend narrowed necks 5c, 5d with reduced overlapping of narrowed necks 5c, 5d and air chamber 5a in the width direction of the rib-shaped land parts 4a. Further, from such viewpoint, as shown in FIG. 1, narrowed necks 5c, 5d are preferably extended from the outer end position in tread circumferential direction of the air chamber 5a to the outer side in tread circumferential direction and opened to circumferential grooves 3a, 3b.

In FIG. 1, regarding resonators 5 disposed in the tread surface 2, resonators 5 in one rib-shaped land part 4a are positioned so as to be deviated to resonators in the other rib-shaped land part 4a, in the tread circumferential direction. However, they may be disposed in the same position in the tread circumferential direction.

In the rib-shaped land parts 4a defined between two circumferential grooves 3a and 3b having different sectional areas, it is possible to dispose, in addition to a resonator 5 having a first narrowed neck 5c and a second narrowed neck 5d, a resonator with only one narrowed neck and/or a resonator wherein the respective sectional areas of the first narrowed neck and the second narrowed neck are the same.

Embodiments of the disclosure have been explained with reference to the drawings. However, the pneumatic tire disclosed herein is not intended to be limited to the above examples and may be modified as appropriate.

EXAMPLES

Although the disclosure will be described below in further detail with reference to examples, the disclosure is not intended to be limited in any way to the following examples.

Sample tires of examples according to an embodiment of the disclosure and sample tires of comparative example were prepared, and the following experiments 1 to 3 were conducted.

Experiment 1

In experiment 1, using pneumatic tires provided, in the tread surface, with four circumferential grooves extending in the tread circumferential direction with the sectional area of the two circumferential grooves in the inner side in tire width direction being larger than that of the two circumferential grooves in the outer side in the tire width direction, and having a Helmholtz-type resonator in the rib-shaped land part defined between two circumferential grooves having different sectional areas, the following sample tires with the respective sectional areas of one first narrowed neck and one second narrowed neck of the resonator varied were prepared. With these tires, the reduction effect of air column resonance sound generated in the circumferential groove was confirmed by a noise test, and steering stability was confirmed by a driver's sensory evaluation.

The tire of example 1 is a pneumatic tire for an automobile with a tire size of 195/45R15 having a tread pattern shown in FIG. 1, wherein two circumferential grooves in the inner side in the tire width direction have a sectional area of 80 mm$^2$ (width 10 mm, depth 8 mm), two circumferential grooves in the outer side in the tire width direction have a sectional area of 64 mm² (width 8 mm, depth 8 mm). Further, regarding the resonator, the sectional area of the first narrowed neck is 3 mm² (width 0.75 mm, depth 4 mm), the length of the first narrowed neck is 10 mm, the sectional area of the second narrowed neck is 3.3 mm² (width 0.83 mm, depth 4 mm), the length of the second narrowed neck is 10 mm, the volume of the air chamber is 1560 mm³, the resonance frequency thereof is 1020 Hz, and fifty-two of them were disposed in one row of rib-shaped land parts.

Other than that the sectional areas of the first narrowed neck and the second narrowed neck were changed to specifications shown in Table 1 and that each dimension of the narrowed neck was adjusted so that the resonance frequency is the same as that of the tire of example 1, the tires of examples 2 to 7 were prepared in the same way as the tires of example 1.

Further, other than that the sectional areas of the first narrowed neck and the second narrowed neck were changed to specifications shown in Table 1 and that each dimension of the narrowed neck was adjusted, the tires of comparative examples 1 to 3 were prepared in the same way as example 1.

When performing the noise test for air column resonance sound, the above tires were attached to a rim with a size of 7.5 J-15, applied with air pressure of 180 kPa inside, and then mounted onto a vehicle. The vehicle was driven at a constant speed of 80 km/h, and then the engine was stopped to allow the vehicle to coast. At a position 7.5 m sideward from the center of the vehicle and a height from the ground of 1.2 m, lateral noise was measured in accordance with conditions specified by JASO C606, and overall values of the center frequency band of 800 Hz-1000 Hz-1250 Hz in the ⅓ octave band were obtained. Smaller overall values indicate larger noise reducing effect of the resonator disposed in the tread surface of the pneumatic tire. The results are shown in Table 1.

The resonators disposed on these sample tires satisfy the above formulas (1) and (2), and the speed of sound c was 343.7 m/s.

Further, when performing the steering stability test, each of the above tires were mounted on a vehicle in the same way as the above noise test. Sensory evaluation on steering stability was performed when the driver drove the vehicle, and with the steering stability of the tire of comparative example 1 set to be 6 out of 10, relative evaluation was performed. The results of relative evaluation are shown in Table 1. Larger values indicate better steering stability.

As a result of this test, it was revealed that, for the tires of examples 1 to 7 and comparative examples 1 and 2, by varying the sectional area S1 of the first narrowed neck and the sectional area S2 of the second narrowed neck, air column resonance sound is reduced compared to the tire of comparative example 3 where the sectional area S1 of the first narrowed neck and the sectional area S2 of the second narrowed neck are the same. Further, it was revealed that, for the tires of examples 1 to 7, by making the sectional area S1 of the first narrowed neck smaller than the sectional area S2 of the second narrowed neck, air column resonance sound is reduced compared to the tires of comparative examples 1 and 2 where the sectional area S1 of the first narrowed neck is larger than the sectional area S2 of the second narrowed neck, without deteriorating steering stability.

Further, for the tires of examples 2 to 7, the sectional area S1 of the first narrowed neck and the sectional area S2 of the second narrowed neck were set to satisfy a relation of S2/S1≥1.2, and therefore air column resonance sound is reduced and steering stability is improved, compared to the tire of example 1.

Experiment 2

In experiment 2, using the tire of example 2, and without changing the resonance frequency of the resonators and the relation between the total sectional area of the first narrowed necks of each resonator and the total sectional area of the second narrowed necks of each resonator, the numbers of the first narrowed necks and the second narrowed necks were changed to prepare the following sample tires, and the same tests as experiment 1 were conducted.

Other than the changes described below, the following tires were prepared in the same way as the tire of example 2. Regarding the tire of example 8, the number of first narrowed necks was changed to two. Regarding the tire of example 9, the number of second narrowed necks was changed to two. Regarding the tire of example 10, the numbers of first narrowed necks and second narrowed necks were each changed to two. The results are shown in Table 2.

TABLE 1

|  | Noise Test (dB) | Steering Stability | S2/S1 | Sectional Area S1 of First Narrowed Neck (mm²) | Sectional Area S2 of Second Narrowed Neck (mm²) | Volume of Air Chamber (mm³) | Resonance Frequency (Hz) | Sectional Area of Circumferential Groove (mm²) |
|---|---|---|---|---|---|---|---|---|
| Comparative Example 1 | 65 | 6 | 0.8 | 3 | 2.4 | 1560 | 990 | 80/64 |
| Comparative Example 2 | 65.2 | 6 | 0.9 | 3 | 2.7 | 1560 | 1000 | 80/64 |
| Comparative Example 3 | 65.5 | 7 | 1 | 3 | 3 | 1560 | 1010 | 80/64 |
| Example 1 | 65.3 | 7 | 1.1 | 3 | 3.3 | 1560 | 1020 | 80/64 |
| Example 2 | 64.8 | 8 | 1.2 | 3 | 3.6 | 1560 | 1000 | 80/64 |
| Example 3 | 64.9 | 9 | 1.4 | 3 | 4.2 | 1560 | 990 | 80/64 |
| Example 4 | 64.9 | 8 | 2.9 | 1.5 | 4.35 | 1560 | 1000 | 80/64 |
| Example 5 | 64.9 | 8 | 3 | 1.5 | 4.5 | 1560 | 1010 | 80/64 |
| Example 6 | 65.1 | 7 | 3.1 | 1.5 | 4.65 | 1560 | 1020 | 80/64 |
| Example 7 | 65.3 | 7 | 3.2 | 1.5 | 4.8 | 1560 | 1000 | 80/64 |

TABLE 2

|  | Noise Test (dB) | Steering Stability | S2/S1 | First Narrowed Neck | | Second Narrowed Neck | |
|---|---|---|---|---|---|---|---|
|  |  |  |  | Number of Narrowed Necks | Sectional Area S1' (mm²) | Number of Narrowed Necks | Sectional Area S2' (mm²) |
| Comparative Example 3 | 65.5 | 7 | 1 | 1 | 3 | 1 | 3 |
| Example 2 | 64.8 | 8 | 1.2 | 1 | 3 | 1 | 3.6 |
| Example 8 | 64.8 | 8 | 1.2 | 2 | 1.5 | 1 | 3.6 |
| Example 9 | 64.8 | 8 | 1.2 | 1 | 3 | 2 | 1.8 |
| Example 10 | 64.8 | 8 | 1.2 | 2 | 1.5 | 2 | 1.8 |

*Sectional areas S1' and S2' indicate the respective sectional areas of one narrowed neck. Here, S1 = S1' × number of narrowed necks, S2 = S2' × number of narrowed necks.

As a result of this test, it was revealed that, with the tires of examples 2, and 8 to 10, even if the number of narrowed necks is changed, the air column resonance sound is reduced compared to the tire of comparative example 3 without deteriorating steering stability.

Experiment 3

In experiment 3, using the tire of example 2, the respective extending directions from the air chamber of the first narrowed neck and the second narrowed neck were directed toward the inner side in the tread circumferential direction with respect to the air chamber to prepare a sample tire of example 11 having a tread pattern shown in FIG. 5, and pitch noise was confirmed by a noise test, and steering stability was confirmed by a driver's sensory evaluation.

In the noise test for pitch noise, measurement was conducted in the same way as the noise test for air column resonance, and as the pitch noise frequency varies depending on the speed of the vehicle, circumferential length of the tire, number of resonators, and the like, the overall values of a center frequency value of 630 Hz, in the ⅓ octave band were determined as the pitch noise and the values thereof were obtained for each sample tire. The smaller overall values indicate that more pitch noise is reduced. The results are shown in Table 3.

TABLE 3

|  | Noise Test for Pitch Noise (dB) | Steering Stability | S1/S2 | Extending Direction of Narrowed Neck |
|---|---|---|---|---|
| Example 2 | 64.5 | 8 | 1.2 | Outer Side in Circumferential Direction |
| Example 11 | 65.6 | 8 | 1.2 | Inner Side in Circumferential Direction |

As a result of this test, with the tire of example 2, since the respective extending directions from the air chamber of the first narrowed neck and the second narrowed neck were directed toward the outer side in the tread circumferential direction with respect to the air chamber, the pitch noise is reduced compared to the tire of example 11 while maintaining steering stability.

INDUSTRIAL APPLICABILITY

It is possible to provide a pneumatic tire with improved noise reduction performance exhibited by a resonator without deteriorating steering stability.

REFERENCE SIGNS LIST

1 Pneumatic tire
2 Tread surface
3 Circumferential groove
3a Circumferential groove (with relatively large sectional area)
3b Circumferential groove (with relatively small sectional area)
4 Rib-shaped land part
4a Rib-shaped land part (defined between two circumferential grooves having different sectional areas)
5 Resonator
5a Air chamber
5b Narrowed neck
5c Narrowed neck (opened to circumferential groove with relatively large sectional area)
5d Narrowed neck (opened to circumferential groove with relatively small sectional area)
6 (Modeled) resonator
7, 7a, 7b Narrowed neck (of modeled resonator)
8 Air chamber (of modeled resonator)
S1 Sectional area of narrowed neck (opened to circumferential groove with relatively large sectional area)
S2 Sectional area of narrowed neck (opened to circumferential groove with relatively small sectional area)

The invention claimed is:

1. A pneumatic tire provided, in a tread surface, with at least two circumferential grooves continuously extending in a tread circumferential direction, and a resonator disposed in a land part defined between first and second circumferential grooves having different sectional areas, the resonator having an air chamber opened to a land part surface in a position separated away from the first and second circumferential grooves, one or more narrowed necks communicating the air chamber with one of the first and second circumferential grooves, and one or more narrowed necks communicating the air chamber with the other of the first and second circumferential grooves, wherein
the first circumferential groove has a larger sectional area than that of the second circumferential groove,
a sectional area S1 of the narrowed neck of the resonator, opened to the first circumferential groove is smaller than a sectional area S2 of the narrowed neck of the resonator, opened to the second circumferential groove,
the sectional area Si and the sectional area S2 of the narrowed necks satisfy a relation of 3≥S2/S1≥1.2
the first circumferential groove is located in an inner side in a tire width direction with respect to the second circumferential groove, and the number of the narrowed necks opened to the first circumferential groove is smaller than the number of the narrowed necks opened to the second circumferential groove.

* * * * *